United States Patent [19]

Meehan et al.

[11] Patent Number: 4,793,927
[45] Date of Patent: Dec. 27, 1988

[54] METHOD OF TREATING SEWAGE

[75] Inventors: Peter P. Meehan; Robert S. Reimers, both of Metairie; Thomas G. Akers; Maurice D. Little, both of New Orleans, all of La.

[73] Assignees: Tulane Medical Center of Tulane Univ., New Orleans; Chemfix Technologies, Inc., Metairie, both of La. ; a part interest to each

[21] Appl. No.: 6,767

[22] Filed: Jan. 27, 1987

[51] Int. Cl.⁴ .................................................. C02F 1/68
[52] U.S. Cl. ..................................... 210/751; 71/12; 71/901; 210/764
[58] Field of Search ........................................ 71/8-10, 71/12, 901; 210/751, 764

[56] References Cited

U.S. PATENT DOCUMENTS

| | | | |
|---|---|---|---|
| 3,325,356 | 6/1967 | Di Netta | 167/53 |
| 3,837,872 | 2/1986 | Conner | 106/74 |
| 4,269,829 | 5/1981 | Seidel et al. | 424/211 |
| 4,310,537 | 1/1982 | Kilbourn et al. | 424/300 |
| 4,471,916 | 9/1984 | Donaldson | 241/42 |
| 4,509,696 | 4/1985 | Donaldson | 210/751 X |
| 4,518,508 | 5/1985 | Conner | 210/751 |
| 4,547,491 | 10/1985 | Mrozik et al. | 424/180 |
| 4,552,666 | 11/1985 | Muller | 210/751 X |

OTHER PUBLICATIONS

CA 89: 38042R, Chefranova, 1978, "Disinfecting . . . Helminths".
CA 86: 145226p., Chefranova et al. "New . . . Application", 1974.
Chefranova et al., "Experience in Use of Ammonium for the Purpose of Destroying Ova of Ascarids in Sewage Sludge on Sludge Beds", Tropical Diseases Bulletin, vol. 76, No. 3, Abstract 556.
Chefranova et al., "A New Agrochemical Method for Decontaminating Sewage For Helminth Ova and Some Prospects for its Application", Helminthological Abstract Series A, vol. 45, No. 11 (1976) Abstract 5830.
Chefranova et al., "Helminthological Assessment of the Solid Part of Sewage Used as Fertiliser After Treatment with Ammonia", Helminthological Abstract Series A, vol. 47, No. 3 (1978) Abstract 1272.
Reimers et al., "Investigation of Parasites in Sludges and Disinfection Techniques", U.S. EPA Project Sumary, EPA/600/S1-85/022 (Jan. 1986).
Reimers et al., "Parasites in Southern Sludges and Disinfection by Standard Sludge Treatment", U.S. EPA Project Summary, EPA-600/S2-81-166 (Oct. 1981).
Chefranova et al. "The Possible Use of Anhydrous Ammonia for the Anthelmintic Treatment of Manure of Pig Farms", Helm. Abst. Ser. A, vol. 45(11)(1976) Abst. 5831.
Chilikin, M. M., "Disinfection From Helminth Ova by Ammonium Hydroxide and Carbathion of the Mechanically Separated Solid Part of Sewage", Helminthological Abstract Series A, vol. 47, No. 3 (1978) Abstract 1273.
Popova et al., "Sanitary and Helminthological Assessment of Some Methods of Decontaminating Liquid Manure", Helminthological Abstract Series A, vol. 49, No. 2 (1980) Abstract 920.
Cherepanov et al., "Decontamination of Sewage Sludge and Effluent From Large-Scale Animal Units", Heminthological Abstract Series A, vol. 53 (1984) Abstract 1519.

Primary Examiner—Ferris H. Lander
Attorney, Agent, or Firm—Klarquist, Sparkman, Campbell, Leigh & Whinston

[57] ABSTRACT

A method of treating sewage is disclosed. Sewage is mixed with an ammonia source, and the mixture is formed into a substantially impermeable mass. The substantially impermeable nature of the mixture increases the ammonia concentration therein and substantially completely destroys all viable parasites. When the impermeable mass is formed by addition of cement and silicate, a strongly alkaline environment is created that kills bacteria and viruses. The resulting end product is a friable mass that is substantially free of pathogens and suitable for unrestricted reuse.

21 Claims, 2 Drawing Sheets

AMMONIA EXPOSURE FOR PARASITE INACTIVATION OF PRODUCT

FIG. 3    AMMONIA EXPOSURE FOR PARASITE INACTIVATION OF PRODUCT

METHOD OF TREATING SEWAGE

BACKGROUND OF THE INVENTION

1. Field of the Invention

This invention concerns a method of treating sewage, and more specifically concerns a process for reducing pathogens within the sewage.

2. General Discussion of the Background

The appropriate disposal of sewage has long been a problem, and this problem continues to grow as population densities increase. Typical sewage contains such things as raw human and animal wastes, garbage, related domestic wastes, and perhaps even toxic metals. A broad variety of pathogens, such as bacteria, fungi, viruses, parasites and protozoans, survive in this organic environment. Industry has long sought a method of disposing of the wastes and pathogenic organisms without infecting the environment, humans, domestic animals, or the food chain.

Since great volumes of sewage sludge are produced each year, it would be desirable to reuse the sludge. For example, the sludge could be reused as landfill, fertilizer, or erosion control material. Such reuses are dangerous, however, if the sludge contains significant amounts of pathogens.

The U.S. Environmental Protection Agency (EPA) has recognized the problems which disposal of pathogen infested waste can present. In response to these problems, the EPA has issued guidelines at 40 C.F.R. §257 concerning land disposal of sewage sludge which contains pathogens. The EPA regulations recognize three separate categories of sludge: unstabilized sludge, sludge exposed to a process to significantly reduce pathogens (PSRP), and sludge exposed to a process to further reduce pathogens (PFRP). "Unstabilized sludge" has not been exposed to any pathogen reducing process, is not suitable for land disposal, and can only be incinerated, buried or heat dried. Sludge which undergoes a PSRP, such as anaerobic digestion, heat treatment, lime stabilization, or air drying, can be disposed on land only if public access to the land is controlled for a period of from 12 to 18 months. Finally, sewage which has undergone a PFRP has no disease related restrictions on reuse. Unfortunately, previous PFRP methods have been expensive, highly energy intensive processes such as irradiation or thermal processing which are unsuitable for transforming the sewage sludge into a readily reusable end product.

Another drawback with these PFRP methods is that they fail to destroy some parasites, such as the ascarid. The ascarid is a type of helminth worm that is a common parasite in the intestines of humans and animals. Particularly susceptible to helminthiasis (intestinal infestation with helminths) are ruminants such as sheep, cattle, goats, pigs, horses, and mules. A wide variety of antihelminthic agents have been discovered, and they have varying degrees of efficacy.

Among the classes of materials which are known to be toxic to helminths such as ascarids (*Ascaris suum, A. lumbricoibes*) are the 2-substituted benzimidazoles of U.S. Pat. No. 3,325,356, phosphoramidates of U.S. Pat. No. 4,269,829, acetyl and carbalkoxythioureidobenzophenones of U.S. Pat. No. 4,310,537, and avermectin and milbemycin compounds of U.S. Pat. No. 4,547,491. Such compounds, however, are intended for therapeutic use in individual animals and are unsuitable for general addition to sewage sludge.

It has previously been found that ammonia can be toxic to ascarids. For example, Chefranova and his associates have disclosed in the *Tropical Diseases Bulletin*, Vol. 76, No. 3, Abstract 556, and Helminthological Abstract Series A, Vol. 45, No. 11 (1976), Abstract 5830, and Vol. 47, No. 3, Abstract 1272, that treatment of sewage with 3–4% ammonia by volume destroyed all viable ascarids present. Reducing the ammonia concentration to 2%, however, left many of the eggs viable.

Other Russian researchers have found that relatively high volumes of ammonia are toxic to ascarids. Part of the problem encountered by the Russian researchers, however, has been that ammonia evaporates and reduces the concentration of toxic ammonia present to combat ascarids.

In the United States, Reimers et al. have also investigated helminths in sludge. U.S. EPA Publication 600/S2/81/166 (Oct. 1981) Order No. PB 82-102 344 and EPA/600/S1/185/022 (Jan. 1986) Order No. PB 86-135 407/AS. The 1981 study, which is part of the work leading to the present application, concluded that conventional sludge treatment processes (e.g. mesophilic anaerobic or aerobic digestion) were not very effective in destroying parasite eggs, and ammonification studies of ascarids were inconclusive. The 1986 study found that when ammonium sulfate at a dosage of 50 mg ammonia per gram of sludge was added to sludge previously aerobically digested at 25° C. for 10 days, there was little effect on the ascarid eggs during the first 5 days. After ten days, 62% of the eggs were inactivated. When the ammonia concentration was increased to 500 mg/g solids, complete or near complete inactivation was observed after 10 days. When ammonia gas was added to sludges previously aerobically digested at 25° C. at detention times of 10, 20, or 30 days, a dosage of 1% ammonia was necessary to obtain effective inactivation of the ascarid eggs.

A serious problem with ammonification of sewage sludge is that a large enough amount of ammonia must be added to the sludge to kill ascardis within a reasonable period of time. It was previously thought that at least 2% ammonia by volume was required to effectively destory most viable ascarids in sludge within ten days. If the sludge wa not sealed in an airtight reaction vessel, however, additional amounts of ammonia were required to compensate for volatilization.

Another waste product treatment process is disclosed in U.S. Pat. No. 3,837,872 which was re-examined and subsequently issued as Re-examination Patent B13,837,872. The '872 process concerns treatment of sewage sludge and other wastes by chemical fixation and physical entrapment of pollutants. The waste is treated by mixing it with a setting agent and silicate, preferably in a sewage to setting agent to silicate ratio of about 10:1:0.5 by volume. The resulting product is a friable, clay-like mass having a polymer lattice that entraps and prevents migration of toxic materials such as heavy metals and some organics.

The present inventors have found that the process of the '872 patent can reduce viability of ascarid eggs in sewage sludge. It is believed that the highly alkaline environment of the chemical fixation process hydrolyzes nitrogen containing wastes in the sludge to evolve some ammonia to kill some ascarid eggs. The previously patented process, however, still leaves about 60% of the ascarid eggs viable. Waste containing such a high percentage of viable ascarid eggs fails to satisfy environmental regulations for substantial elimination of parasites from treated sludge which is to come into contact with humans or their food chain. For safety and in order to qualify as a PFRP, at least about 99.9% of viable parasites must be destroyed. The level of indicator pathogens in a spiked sample must be reduced by three logs. Such a test is designed to ensure that actual municipal sludge treated with the process will substantially eliminate all the parasites, and the '872 process would not qualify.

The '872 process is, however, otherwise effective in satisfying EPA requirements for a PFRP with respect to bacteria and viruses. The highly alkaline environment produced by the '872 process is toxic to bacteria and viruses, reducing their total coliform at least three logs such that less than 0.1% of them survive the treatment. The '872 process fails, however, to qualify as a PFRP since a substantial percentage of parasites remain viable.

It is accordingly an object of this invention to provide a method of treating sewage sludge which substantially completely eliminates viable ascarid eggs from sewage sludge.

Another object of the invention is to provide a method of treating sewage sludge such that the sludge will satisfy EPA regulations for a process for further reducing pathogens (PFRP), thereby rendering the treated sludge suitable for profitable reuse as landfill, landfill cover, fertilizer or erosion control material.

Yet another object of the invention is to provide such a method which produces a product that is not subject to reinfection.

Even yet another object is to provide a method of sewage treatment which is economical and results in a nontoxic product.

A still further object of the invention is to provide such a method in which relatively small amounts of ammonia are required as compared to the prior art.

Finally, it is an object of this invention to provide such a sewage treatment process which can be performed on a continuous basis to treat large volumes of sewage sludge.

SUMMARY OF THE INVENTION

The aforementioned objects are achieved by providing a method of treating sewage which includes the steps of mixing the sewage with a source of material toxic to parasites and forming a substantially impermeable mass from the mixture of sewage and source of toxic material. The source of toxic material is chosen such that it is sufficient substantially completely to destroy viable parasites within the impermeable mass. Substantially complete destruction of parasites helps ensure that they will not continue to propagate or present a health hazard to humans or animals which directly or indirectly come into contact with the treated sludge.

In more preferred embodiments, sewage sludge is mixed with a solid or liquid ammonia source and a substantially impermeable mass is formed from the mixture. The ammonia source is of a kind that is capable of evolving a sufficient amount of ammonia within the mass substantially completely to destroy viable parasites, such as ascarids. The source of ammonia can provide as little as about 2 g ammonia per kilogram of waste (about 0.2% by volume or weight) and still substantially completely kill all the viable ascarids and other parasites.

One of the inventors believes, without being bound by this theory, that the substantial elimination of viable ascarids using such low volumes of ammmonia is probably due to the substantial impermeability of the mass (about $1 \times 10^{-6}$ cm/sec). As the ammonia source releases ammonia, the concentration of dissolved ammonia increases to supersaturated levels. The increased concentration of the dissolved ammonia promotes movement of ammonia molecules through the thick membrane surrounding Ascaris eggs, thereby the Ascaris organism is inactivated.

In other preferred embodiments, the mixture of sewage and ammonia source are formed into an impermeable mass by mixing the sewage with a silicate and a setting agent in sufficient proportions to form a substantially impermeable mass. For example, the sewage, setting agent and silicate can be mixed in a volume ratio of about 10:1:0.5 to yield a friable, clay-like, substantially gas and liquid impermeable end product which increases ammonia solubility within the mass and provides a reusable end product having properties similar to common clay.

Preferred sources of ammonia for mixture with the sewage include ammonium salts, ammonium hydroxide, anhydrous ammonia, amines, organic compounds containing amine functional group, and compounds with terminal amines. Each of these compounds is hydrolyzed by the highly alkaline environment provided by the silicate and setting agent. The highly alkaline environment (usually pH 11.5–12.5) has the added benefit of substantially completely eliminating viable bacteria and viruses such as Salmonella, Polio Type-1 virus, and rotavirus. Since the process eliminates bacteria, viruses, and parasites, the treated waste is rendered safe for disposal in an unrestricted manner.

The product produced by preferred embodiments of the present method is a friable, clay-like material and can easily be used for such beneficial and profitable purposes as landfill daily cover, landfill final cover, land reclamation material, and erosion control material. Since the material also has a high nitrogen content from the addition of ammonia, the treated sewage is very suitable for use as a fertilizer. The final nitrogen content of the substantially impermeable mass is preferably about 1 to 2%, an ideal range for fertilizer. The mass has enough permeability to allow nitrogen release to the environment after the treated material is spread out and its surface area increased.

BRIEF DESCRIPTION OF THE DRAWINGS

FIG. 3 is a graph illustrating the relationship between ammonia concentration in treated product and the time in days required substantially completely to destroy viable parasites in the sludge.

DETAILED DESCRIPTION

Figure 1:
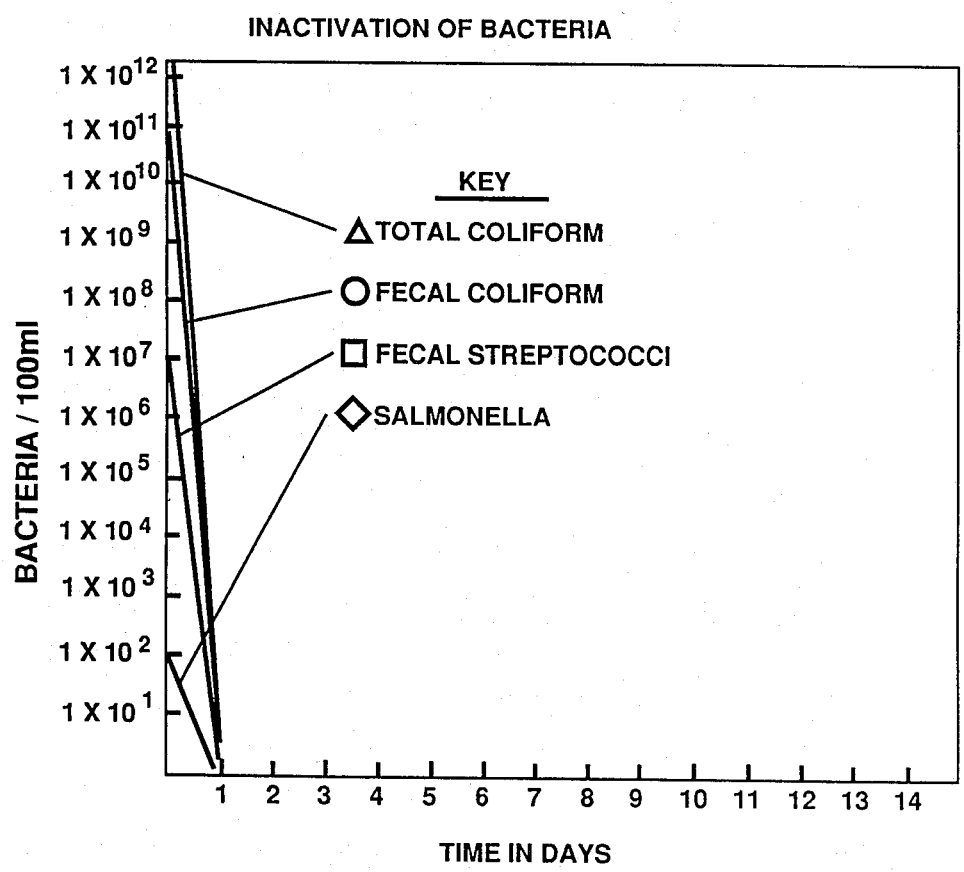
FIG. 1 is a graph illustrating inactivation of bacteria in sewage sludge treated with the process of the present method.

The method of the present invention is designed to satisfy EPA regulations governing a process to further reduce pathogens (PFRP). To meet these regulations, a process must substantially completely kill sewage sludge pathogens such that the treated sludge does not require special handling or restrictions from human contact.

45 C.F.R. §257 defines a PFRP as one which reduces pathogenic bacteria, viruses, parasites, and protozoa cysts to below detectable limits. This can further be defined as reducing indicator pathogens more than three logs and which reduces pathogenic organisms to below 10 organisms per 100 ml. A PFRP can alternately be considered a process which reduces pathogenic indicators of sewage sludge, total coliforms, fecal coliforms, fecal Streptococci, and Ascaris egg spikes, by 99.9% or more. For the purposes of this disclosure, a process which reduces viable pathogens to below detectable limits in sewage sludge will be considered to have substantially completely killed all pathogens. These levels were chosen since they are the detection limits of most equipment, and satisfaction of these limits is the closest one can come to saying the waste is completely free of pathogens.

The process disclosed in U.S. Pat. No. 3,837,872 (the disclosure of which is incorporated by reference) involves treating liquid or semiliquid waste with a setting agent and silicate in a preferred volume ratio of about 10:1:0.5. In a preferred embodiment of the '872 method, Portland cement and sodium silicate are used as the setting agent and silicate, thereby producing a very alkaline environment in the treated sewage sludge. Typically, the pH of sewage sludge treated by this method is about pH 11.5–12.5. Most bacterial and viral pathogens cannot survive at this high pH, and the already existing process substantially completely kills bacteria and viruses. This high alkalinity alone, however, is insufficient to kill resistant parasite eggs, such as Ascaris eggs.

Chemical and physical fixation of pollutants occurs in waste treated with the '872 process. The silicate and setting agent react with polyvalent metal ions in the setting agent or waste to form a network of insoluble polymer matrices that entrap and precipitate heavy metals such as lead, chromium, copper, cadmium, and mercury. The polymer matrices are formed by a reaction between the silicate and polyvalent metal ions, the metal ions being supplied either by the setting agent or the waste itself. Examples of suitable setting agents are Portland cement, lime, and kiln dust. If the waste contains high levels of polyvalent metal ions such as lead or chromium, the waste itself will serve as a setting agent. In such a case, it will not be necessary to add a setting agent such as cement since the polymer matrix will form without it.

The following examples illustrate use of a modification of the '872 method in which a substance is added to the sewage, setting agent, and silicate to evolve ammonia within the reacting mass. As ammonia evolves, the treated mass hardens into a substantially gas and liquid impermeable product that increases the solubility of ammonia within the mass, thereby promoting its movement through the thick membrane surrounding each Ascaris egg.

The following specific examples are intended for purposes of illustration and do not limit the scope of the invention.

EXAMPLE 1

Untreated sewage sludge was obtained from a municipal sewage plant. Three 10 gallon containers of the sludge, which had a 15.5% solids content, were spiked with selected pathogens. After spiking, the levels of indicator pathogens were:

bacteria, *Salmonella livingstone*, $2.3 \times 10^2$ per 100 ml
virus, Polio Type-1, $1 \times 10^5$ TCID50 per 100 ml
parasite, *Ascaris suum* eggs, 2000 per 100 ml.

Ascaris was chosen as the indicator pathogen for parasites since it is known to be an extremely resistant parasite. If viable Ascaris eggs were destroyed, it would be certain that other, less resistant parasites would also be susceptible to the same treatment. Examples of such other less resistant parasites are the eggs of *Taenia saginata, Taenia solium, Toxocara canis, Toxocara cati,* and *Trichuris trichiura.*

A 250 g sample of the sludge was placed in a bottle and thoroughly mixed with sodium silicate, Portland cement, and a compound which would evolve ammonia in the alkaline environment created by the sodium silicate and cement. Three such bottles of treated sludge were prepared for each of five runs. The first run was a control in which no source of ammonia was added, but the sludge was still chemically fixed by mixing with cement and silicate. The second run used 1% urea by weight as the source of ammonia; the third run used 3% urea by weight; the fourth run used 1% $NH_4Cl$ by weight; and the fifth run used 3% $NH_4Cl$ by weight. The gram amounts of each of the reactants is set forth in the following table.

TABLE I

| | Urea (g) (as N) | $NH_4Cl$ (g) (as N) | Silica (g) | Cement (g) |
|---|---|---|---|---|
| Chemical Fixation only (control) | — | — | 28.0 | 55.0 |
| 1% Urea (as N) | 2.50 | — | 28.6 | 56.2 |
| 3% Urea (as N) | 7.50 | — | 29.8 | 58.6 |
| 1% $NH_4Cl$ (as N) | — | 2.61 | 29.1 | 57.1 |
| 3% $NH_4Cl$ (as N) | — | 7.83 | 31.2 | 61.3 |

The jar containing the mixture was capped, and the mixture allowed to stand for 30 days. The mass immediately formed a gel, but after about 12 hours, it became a friable clay-like, substantially gas and liquid impermeable mass.

The friable product was then examined on days 3, 7, 14, and 30 for the presence of parasites. The results are summarized in the following Tables II, III, and IV. Table II shows the number of viable eggs per kilogram dry weight of treated product. Table III shows the number of viable eggs per 100 ml when the treated product was diluted with 100 ml water. Table IV summarizes viability of Ascaris eggs after treatment.

Neither chemical fixation alone nor chemical fixation with urea added substantially completely destroyed viable Ascaris. A much better result was obtained by addition of 1% or 3% $NH_4Cl$. The sample treated with 1% $NH_4Cl$ destroyed more than 99% of the viable parasites within seven days, and more than 99.9% within fourteen days. Treatment with 3% $NH_4Cl$, however, destroyed all viable Ascaris eggs within seven days.

TABLE II

| NUMBER OF ASCARIS EGGS PER KG DRY WEIGHT | | |
|---|---|---|
| | Viable Eggs | Total Eggs |
| DAY 3 | | |
| Raw Sludge (Spiked) | NA | NA |
| Chemical | 32,798 | 38,117 |
| Fixation Only | 26,325 | 28,567 |

TABLE II-continued
NUMBER OF ASCARIS EGGS PER KG DRY WEIGHT

| | | Viable Eggs | | Total Eggs |
|---|---|---|---|---|
| | | 15,695 | | 17,522 |
| | mean = | 24,939 | mean = | 28,069 |
| | S.D. = | (7,051) | S.D. = | (8,415) |
| Chemical | | 11,577 | | 12,751 |
| Fixation + 1% Urea | | 51,508 | | 56,964 |
| | | 40,938 | | 47,062 |
| | mean = | 34,674 | mean = | 38,926 |
| | S.D. = | (16,893) | S.D. = | (18,945) |
| Chemical | | 22,348 | | 23,433 |
| Fixation + 3% Urea | | 3,739 | | 3,989 |
| | | 13,798 | | 14,957 |
| | mean = | 13,295 | mean = | 14,126 |
| | S.D. = | (7,605) | S.D. = | (7,960) |
| Chemical | | 37,094 | | 50,105 |
| Fixation + 1% NH$_4$Cl | | 50,300 | | 66,476 |
| | | 27,332 | | 37,275 |
| | mean = | 38,242 | mean = | 51,285 |
| | S.D. = | (9,412) | S.D. = | (11,950) |
| Chemical | | 2,064 | | 43,447 |
| Fixation + 3% NH$_4$Cl | | 1,573 | | 28,704 |
| | | 1,769 | | 63,099 |
| | mean = | 1,802 | mean = | 45,083 |
| | S.D. = | (202) | S.D. = | (14,089) |
| DAY 7 | | | | |
| Chemical Fixation | | 20,655 | | 23,761 |
| | | 39,469 | | 47,044 |
| | | 28,226 | | 34,047 |
| | mean = | 29,450 | mean = | 34,950 |
| | S.D. = | (7,729) | S.D. = | (9,527) |
| Chemical | | 27,845 | | 33,182 |
| Fixation + 1% Urea | | 19,146 | | 23,059 |
| | | 25,524 | | 29,915 |
| | mean = | 24,172 | mean = | 28,719 |
| | S.D. = | (3,679) | S.D. = | (4,218) |
| Chemical | | 26,740 | | 31,734 |
| Fixation + 3% Urea | | 14,256 | | 16,592 |
| | | 12,726 | | 14,739 |
| | mean = | 17,907 | mean = | 21,022 |
| | S.D. = | (6,277) | S.D. = | (7,612) |
| Chemical | | 156 | | 47,109 |
| Fixation + 1% NH$_4$Cl | | 1,283 | | 69,422 |
| | | 0 | | 57,102 |
| | mean = | 479 | mean = | 57,878 |
| | S.D. = | (572) | S.D. = | (9,126) |
| Chemical | | 0 | | 51,538 |
| Fixation + 3% NH$_4$Cl | | 0 | | 65,577 |
| | | 0 | | 76,008 |
| | mean = | | mean = | 64,374 |
| | S.D. = | | S.D. = | (10,026) |
| DAY 14 | | | | |
| Chemical Fixation | | 16,559 | | 26,110 |
| | | 24,033 | | 34,062 |
| | | 23,161 | | 33,584 |
| | mean = | 21,251 | mean = | 31,252 |
| | S.D. = | (3,337) | S.D. = | (3,641) |
| Chemical | | 26,702 | | 33,256 |
| Fixation + 1% Urea | | 22,333 | | 29,045 |
| | | 25,331 | | 31,715 |
| | mean = | 24,789 | mean = | 31,339 |
| | S.D. = | (1,824) | S.D. = | (1,740) |
| Chemical | | 17,587 | | 22,511 |
| Fixation + 3% Urea | | 9,849 | | 14,304 |
| | | 11,725 | | 14,621 |
| | mean = | 13,054 | mean = | 17,145 |
| | S.D. = | (3,296) | S.D. = | (3,796) |
| Chemical | | 0 | | 37,208 |
| Fixation + 1% NH$_4$Cl | | 0 | | 58,942 |
| | | 84 | | 69,137 |
| | mean = | 28 | mean = | 55,096 |
| | S.D. = | (40) | S.D. = | (13,316) |
| Chemical | | 0 | | 51,340 |
| Fixation + 3% NH$_4$Cl | | 0 | | 42,871 |
| | | 0 | | 54,700 |
| | mean = | 0 | mean = | 49,637 |
| | S.D. = | (0) | S.D. = | (4,977) |
| DAY 30 | | | | |
| Raw Sludge (Spiked) | | 11,936 | | 23,562 |
| Chemical Fixation | | 8,573 | | 15,988 |
| | | 15,230 | | 32,216 |
| | mean = | 11,913 | mean = | 23,922 |
| | S.D. = | (2,718) | S.D. = | (6,630) |
| Chemical | | 11,676 | | 36,550 |
| Fixation + 1% Urea | | 5,036 | | 23,432 |
| | | 3,434 | | 10,909 |
| | mean = | 6,715 | mean = | 23,630 |
| | S.D. = | (3,568) | S.D. = | (10,469) |
| Chemical | | 4,481 | | 19,222 |
| Fixation + 3% Urea | | 2,235 | | 19,453 |
| | | 1,540 | | 10,271 |
| | mean = | 2,752 | mean = | 16,315 |
| | S.D. = | (1,255) | S.D. = | (4,275) |
| Chemical | | 0 | | 39,089 |
| Fixation + 1% NH$_4$Cl | | 77 | | 39,170 |
| | | 77 | | 21,384 |
| | mean = | 51 | mean = | 33,214 |
| | S.D. = | (36) | S.D. = | (8,365) |
| Chemical | | 0 | | 19,701 |
| Fixation + 3% NH$_4$Cl | | 79 | | 32,688 |
| | | 0 | | 27,774 |
| | mean = | 26 | mean = | 26,721 |
| | S.D. = | (37) | S.D. = | (5,354) |

TABLE III
NUMBER OF ASCARIS EGGS PER 100 ml

| | | VIABLE EGGS | | TOTAL EGGS |
|---|---|---|---|---|
| DAY 3 | | | | |
| Raw Sludge (Spiked) | | 7753 | | 8120 |
| Chemical | | 2633 | | 3060 |
| Fixation Only | | 2133 | | 2293 |
| | | 1260 | | 1407 |
| | mean = | 2009 | mean = | 2253 |
| | S.D. = | (567) | S.D. = | (675) |
| Chemical | | 920 | | 1013 |
| Fixation + 1% Urea | | 4093 | | 4527 |
| | | 3253 | | 3740 |
| | mean = | 2753 | mean = | 3093 |
| | S.D. = | (1342) | S.D. = | (1506) |
| Chemical | | 1793 | | 1880 |
| Fixation + 3% Urea | | 300 | | 320 |
| | | 1107 | | 1200 |
| | mean = | 1067 | mean = | 1133 |
| | S.D. = | (610) | S.D. = | (639) |
| Chemical | | 2660 | | 3593 |
| Fixation + 1% NH$_4$Cl | | 3607 | | 4767 |
| | | 1960 | | 2673 |
| | mean = | 2742 | mean = | 3678 |
| | S.D. = | (610) | S.D. = | (857) |
| Chemical | | 140 | | 2947 |
| Fixation + 3% NH$_4$Cl | | 107 | | 1947 |
| | | 120 | | 4280 |
| | mean = | 122 | mean = | 3058 |
| | S.D. = | (14) | S.D. = | (956) |
| DAY 7 | | | | |
| Chemical | | 1727 | | 1987 |
| Fixation Only | | 3300 | | 3933 |
| | | 2630 | | 2847 |
| | mean = | 2462 | mean = | 2922 |
| | S.D. = | (646) | S.D. = | (796) |
| Chemical | | 2327 | | 2773 |
| Fixation + 1% Urea | | 1600 | | 1927 |
| | | 2133 | | 2500 |
| | mean = | 2020 | mean = | 2400 |
| | S.D. = | (307) | S.D. = | (353) |
| Chemical | | 2213 | | 2627 |
| Fixation + 3% Urea | | 1180 | | 1373 |
| | | 1053 | | 1220 |
| | mean = | 1482 | mean = | 1740 |
| | S.D. = | (519) | S.D. = | (630) |

TABLE III-continued

NUMBER OF ASCARIS EGGS PER 100 ml

| | | VIABLE EGGS | | TOTAL EGGS |
|---|---|---|---|---|
| Chemical Fixation + 1% NH₄Cl | | 13 | | 3927 |
| | | 107 | | 5787 |
| | | 0 | | 4760 |
| | mean = | 40 | mean = | 4825 |
| | S.D. = | (48) | S.D. = | (761) |
| Chemical Fixation + 3% NH₄Cl | | 0 | | 3987 |
| | | 0 | | 5073 |
| | | 0 | | 5880 |
| | mean = | 0 | mean = | 4980 |
| | S.D. = | (0) | S.D. = | (776) |
| DAY 14 | | | | |
| Chemical Fixation Only | | 1387 | | 2187 |
| | | 2013 | | 2853 |
| | | 1940 | | 2813 |
| | mean = | 1780 | mean = | 2617 |
| | S.D. = | (279) | S.D. = | (305) |
| Chemical Fixation + 1% Urea | | 2200 | | 2740 |
| | | 1840 | | 2393 |
| | | 2087 | | 2613 |
| | mean = | 2042 | mean = | 2582 |
| | S.D. = | (150) | S.D. = | (143) |
| Chemical Fixation + 3% Urea | | 1500 | | 1920 |
| | | 840 | | 1220 |
| | | 1000 | | 1247 |
| | mean = | 1113 | mean = | 1462 |
| | S.D. = | (281) | S.D. = | (324) |
| Chemical Fixation + 1% NH₄Cl | | 0 | | 2967 |
| | | 0 | | 4700 |
| | | 7 | | 5513 |
| | mean = | 2 | mean = | 4393 |
| | S.D. = | (3) | S.D. = | (1062) |
| Chemical Fixation + 3% NH₄Cl | | 0 | | 4080 |
| | | 0 | | 3407 |
| | | 0 | | 4347 |
| | mean = | 0 | mean = | 3944 |
| | S.D. = | (0) | S.D. = | (396) |
| DAY 30 | | | | |
| Raw Sludge (Spiked) | | 3267 | | 3453 |
| Chemical Fixation Only | | 1040 | | 2053 |
| | | 747 | | 1393 |
| | | 1327 | | 2807 |
| | mean = | 1038 | mean = | 2084 |
| | S.D. = | (237) | S.D. = | (578) |
| Chemical Fixation + 1% Urea | | 1020 | | 3193 |
| | | 440 | | 2047 |
| | | 300 | | 953 |
| | mean = | 587 | mean = | 2064 |
| | S.D. = | (312) | S.D. = | (915) |
| Chemical Fixation + 3% Urea | | 387 | | 1660 |
| | | 193 | | 1680 |
| | | 133 | | 887 |
| | mean = | 238 | mean = | 1409 |
| | S.D. = | (108) | S.D. = | (369) |
| Chemical Fixation + 1% NH₄Cl | | 7 | | 3400 |
| | | 7 | | 3407 |
| | | 0 | | 1860 |
| | mean = | 5 | mean = | 2887 |
| | S.D. = | (3.2) | S.D. = | (728) |
| Chemical Fixation + 3% NH₄Cl | | 0 | | 1740 |
| | | 7 | | 2887 |
| | | 0 | | 2453 |
| | mean = | 2.3 | mean = | 2360 |
| | S.D. = | (3.3) | S.D. = | (473) |

TABLE IV

Results of Parasitologic Study
Summary of Viability of Ascaris Eggs at Different Times after Treatment.
(% Viability, ± standard deviation)

| Sample | Day 3 | Day 7 | day 14 | Day 30 |
|---|---|---|---|---|
| Raw sludge (spiked) | 95.5% (—) | — | — | 94.6% (—) |
| Chemical Fixation only | 89.3% (±2.5%) | 84.6% (±1.7%) | 67.7% (±3.1%) | 50.5% (±2.6%) |
| Chemical Fixation + 1% Urea | 89.2% (±1.5%) | 83.8% (±0.6%) | 79.0% (±1.5%) | 28.3% (±4.8%) |
| Chemical Fixation + 3% Urea | 93.8% (±1.3%) | 85.5% (±0.9%) | 75.7% (±4.9%) | 16.6% (±4.9%) |
| Chemical Fixation + 1% NH₄Cl | 74.3% (±1.0%) | 0.7% (±0.8%) | 0.03% (±0.05%) | 0.1% (±0.1%) |
| Chemical Fixation + 3% NH₄Cl | 4.4% (±1.1%) | 0% (—) | 0% (—) | 0.1% (±0.1%) |

EXAMPLE 2

The batch processing of Example 1 may not be as commercially useful as a continuous process carried out, for example, in a device such as that shown in U.S. Pat. No. 4,471,916, the disclosure of which is incorporated by reference. In an industrial process, raw sewage would be de-watered on a belt filter, dropped onto a conveyer, and moved into a holding hopper. The de-watered sewage sludge would then be screw fed to the chemical fixation reactor. As the sludge entered the reactor, ammonium sulfate would be added through a pug mill from above, then cement would be added and thoroughly mixed with the sludge and ammonium sulfate. Halfway through the chemical fixation reactor, a pug mill would inject sodium silicate in the desired proportions. A reaction would then take place within the reactor to convert the entire mixture of sludge, ammonium sulfate, cement, and silicate to a gel. The gel would be extruded to a solidification container where the gel would harden into a friable solid. During solidification, the highly alkaline environment within the hardening mass would cause a controlled rate of hydrolysis of the ammonium sulfate and nitrogen waste within the sludge, thereby yielding ammonia. As the sludge hardens into an impermeable mass, ammonia concentration within the mass increases, thereby in turn increasing the concentration of ammonia in the water on the surface of Ascaris eggs. This increased concentration of ammonia on the surface of the eggs is believed to allow molecules of the ammonia to penetrate the tough membrane of the Ascaris egg shell, and the Ascaris eggs are killed.

The resulting product would be a friable, clay-like mass that satisfies EPA regulations for a material treated by a process to further reduce pathogens. The clay-like mass could be reused as landfill, landfill cover, fertilizer, or soil erosion material, without restrictions on human contact. Its use as a fertilizer would be particularly attractive because of the high nitrogen content of the clay-like mass. Some potential reuses, and their estimated economic values are shown below in Table V.

TABLE V

| Reuse | Economic Value |
|---|---|
| Landfill Daily Cover | $1–$5/ton |
| Landfill Final Cover (cap) | $3–$12/ton |
| Agricultural Liming/Fertilizer Agent | $150–$180/ton (bagged) |
| Fill (general) | $1–$5/ton |
| Mined Land Reclamation Material | $1–$5/ton (or higher) |
| Erosion Control Material | $2–$10/ton (or higher) |

EXAMPLE 3

The procedure of Example 1 would be repeated, except ammonium sulfate would be replaced by one of the following compounds: ammonium nitrate, ammonium hydroxide, anhydrous ammonia, or an aliphatic amine such as primary n-butyl amine. This chemical fixation process will hydrolyze amine functional groups; thereby the organic nitrogen is converted to ammonia. Chemical fixation will not hydrolyze the urea molecule since the N—N bond is not affected by this process.

EXAMPLE 4

Municipal sewage sludge often contains pathogens other than parasites. It is important, if a treatment is to qualify as a process to further reduce pathogens, that viable bacteria and viruses be eliminated from the sludge along with the parasites. As mentioned in Example 1, the sludge sample was spiked with *Salmonella livingstone* and Poliovirus Type-1. Assays were performed to determine if the sludge treatment process successfully eliminated bacteria and virus from the sludge. The Kenner-Clark procedure published in the *Journal of Water Pollution Control Federation*, pp. 2163–2171 (1979) for the bacterial assay, while Berman's method of elution and concentration of viruses from sludge solids was used for the viruses.

A first 250 g sample of the pathogen spiked raw sewage sludge was placed in a bottle and thoroughly mixed with 28 g sodium silicate and 55 g Portland cement.

A second 250 g sample of the spiked raw sewage sludge was placed in a bottle and thoroughly mixed with 28 g sodium silicate, 56 g Portland cement, and 2.5 g urea.

A third 250 g spiked sample was placed in a bottle and thoroughly mixed with 29 g sodium silicate, 59 g Portland cement, and 7.5 g urea.

After treatment, the sludges were placed in storage for 60 days. Samples were taken according to the scheme shown in Table VI.

TABLE VI

NUMBER OF SAMPLES TAKEN ON SAMPLING DAYS

| Specific Treat- | Sampling Time (Days)* | | | | | | |
|---|---|---|---|---|---|---|---|
| ment Scheme | 0 | 1 | 3 | 7 | 14 | 30 | 60 |
| Chemical Fixation alone | 5** | 5 | 5 | 5 | 5 | 5 | 5 |
| Chemical Fixation w/3% urea | 5 | 5 | 5 | 5 | 5 | 5 | 5 |
| Chemical Fixation w/1% urea | 5 | 5 | 5 | 5 | 5 | 5 | 5 |
| Quality Control | 4 | 2 | 4 | 2 | 4 | 2 | 4 |
| Total Samples 127 | 19 | 17 | 19 | 17 | 19 | 17 | 19 |

*All parasite samples were cultured to determine viability but not tested for infectivity. In addition, the treated sludge was analyzed for total solids and pHs. All samples had quality assurance controls to insure precision and accuracy of analysis.
**Number of pathogen samples.

Coliform assays were conducted on days zero, one, three, seven, fourteen, thirty, and sixty following the *Standard Methods*, 16th Edition, APUA, Washington, D.C. (1985). Salmonella assay was performed on baseline as well as on spiked samples. The results of the analysis for total coliform, fecal coliform, fecal Streptoccoci and Salmonella are shown in Table VII and FIG. 1.

TABLE VII

NUMBER OF BACTERIAL ORGANISMS PER KG DRY WEIGHT

| SAMPLE | TOTAL COLIFORM | FECAL COLIFORM | FECAL STREPTOCOCCUS | SALMONELLA |
|---|---|---|---|---|
| DAY 0 | | | | |
| Raw Sludge | $6.4 \times 10^{12}$ | $1.5 \times 10^{13}$ | $1.5 \times 10^{13}$ | ND |
| | $>1.5 \times 10^{13}$ | | $1.5 \times 10^{13}$ | |
| | $>1.5 \times 10^{13}$ | | $1.5 \times 10^{13}$ | |
| | $1.0 \times 10^{13}$ | | $1.5 \times 10^{13}$ | |
| | log mean $13.103 \pm 0.17$ | | mean $\leq 1.5 \times 10^{13} \pm 0$ | |
| Raw Sludge + Spike | NA | NA | NA | NA |
| DAY 1 | | | | |
| Chemical Fixation | <952 | <952 | <9520 | ND |
| | <952 | <952 | <9520 | |
| | <952 | <952 | <9520 | |
| | <952 | <952 | <9520 | |
| | <952 | <952 | <9520 | |
| | mean = $952 \pm 0$ | mean = $\leq 952 \pm 0$ | mean = $9520 \pm 0$ | |
| Chemical Fixation + 1% Urea | <8359 | <836 | <8360 | ND |
| | <8359 | <836 | <8360 | |
| | <8359 | <836 | <8360 | |
| | <8359 | <836 | mean = $8360 \pm 0$ | |
| | <8359 | <836 | | |
| | mean = $8360 \pm 0$ | mean = $836 \pm 0$ | | |
| Chemical Fixation + 3% Urea | <774 | <774 | <7740 | ND |
| | <774 | <774 | <7740 | |
| | <774 | <774 | <7740 | |
| | <774 | <774 | mean = $7740 \pm 0$ | |
| | <774 | <774 | | |

TABLE VII-continued

| SAMPLE | NUMBER OF BACTERIAL ORGANISMS PER KG DRY WEIGHT | | | |
|---|---|---|---|---|
| | TOTAL COLIFORM | FECAL COLIFORM | FECAL STREPTOCOCCUS | SALMONELLA |
| DAY 3 | mean = 774 ± 0 No Solids Data | mean = 774 ± 0 | | |
| DAY 7 | <81 | <81 | <81 | ND |
| Chemical Fixation | <81 <81 | <81 <81 | <81 <81 | |
| | mean = <81 ± 0 | mean = <81 ± 0 | mean <81 ± 0 | |

ND - Below detectable limits

A reduction in bacterial densities of at least seven to ten logs and to less than three per 100 ml was observed after one day of treatment with either the chemical fixation process alone or the chemical fixation process with urea addition. No Salmonella was detected. It is believed that the high pH of the chemical fixation process alone created the bactericidal envirnoment.

Figure 2:
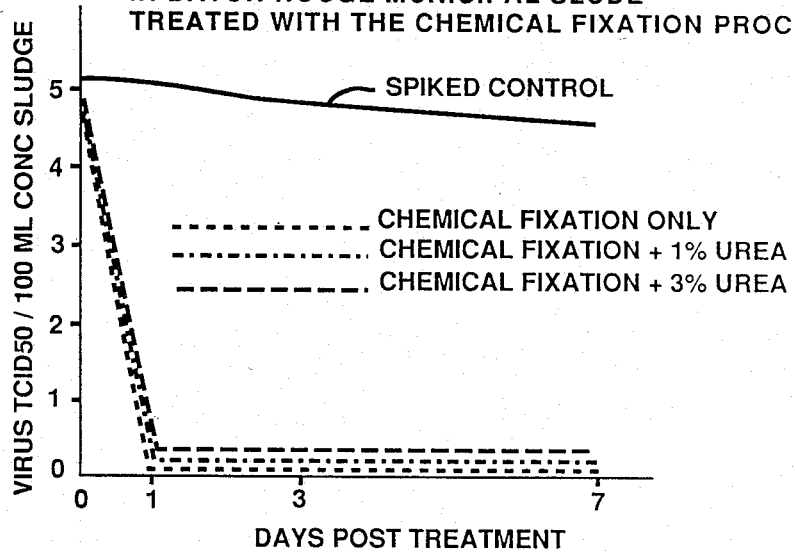
FIG. 2 is a graph illustrating inactivation of Poliovirus Type-1 in sewage sludge treated with the process of the present invention.
Figure 2:
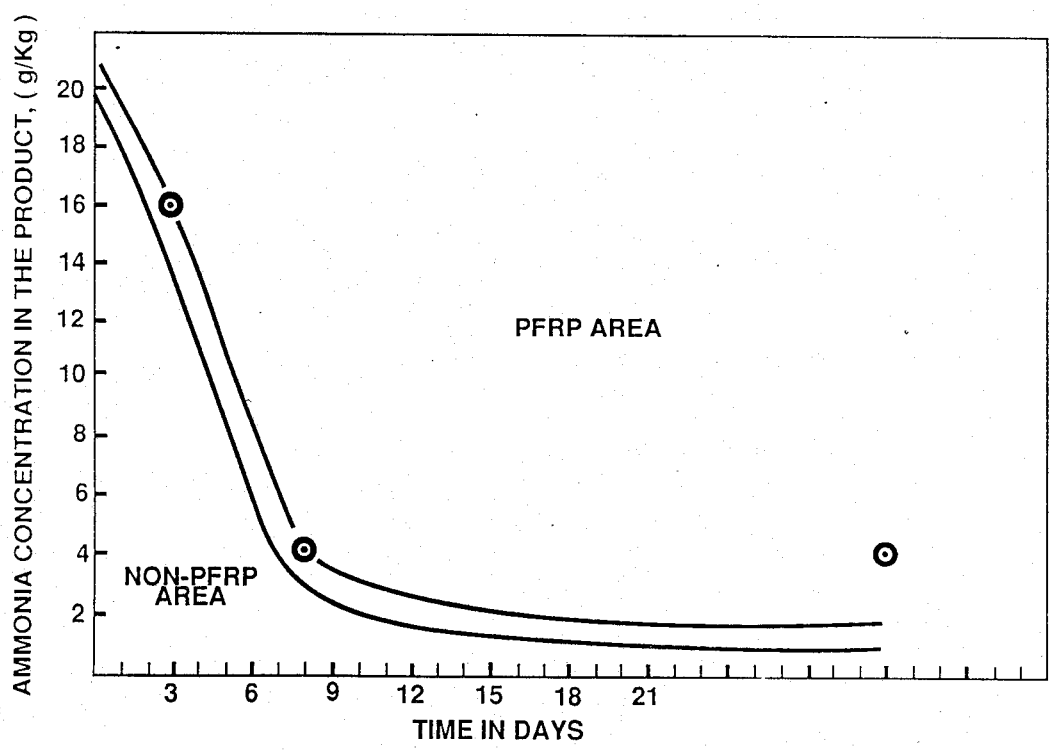

The results of the virus analysis indicated that the chemical fixation process alone inactivated polio virus and rotaviruses within 24 hours after treatment. The spiked virus titer in untreated concentrated samples was 5.1 logs TCID No. 50 per 100 ml. After seven days, the titer in raw, untreated concentrated samples was 4.8 logs TCID 50 per 100 ml. However, after treating the spiked sludge with the chemical fixation process only, or the chemical fixation process supplemented with either 1 or 3% urea, no virus was detected in either the one or seven day post treatment concentrated samples. For both the one and seven day spiked control sludge samples, the virus identity was confirmed as Poliovirus Type-1. The results of the virus analysis are shown in Table VIII and FIG. 2.

TABLE VIII

POLIOVIRUS TYPE-1 SURVIVAL
IN CHEMICAL FIXATION TREATED SLUDGE

| SAMPLE | VIRUS TITER (TCID50/100 m.)* | |
|---|---|---|
| | Day 1 | Day 7 |
| Raw Sludge | <1 log** | NT |
| Spiked Sludge | 5.51 logs | 4.85 logs |
| Chemical Fixation Only | Neg.*** | Neg. |
| Chemical Fixation + 1% urea | Neg. | Neg. |
| Chemical Fixation + 3% urea | Neg. | Neg. |

*TCID50 = 50% Tissue Culture Infective Dose.
**Raw sludge samples yielded Poliovirus Type-1 and also tested ELISA positive (2+) for rotaviruses. Spiked chemical fixation treated samples tested ELISA negative for rotaviruses.
***Neg. = <3 PFU/100 ml.
NT = Not Tested.

EXAMPLE 5

One benefit of the method of Example 1 is that it can be varied to achieve a PFRP product within a selected period of time. The graph shown in FIG. 3 demonstrates the relationship between ammonia concentration in the product and the number of days required to achieve PFRP status.

If, for example, one desired to produce a PFRP product with a six day holding time, enough ammonia source would be added to bring the ammonia concentration in the end product to about 5 g/kg (0.5% by weight substantially equals 0.5% by volume). In a 250 g sample of raw sewage, as in Example I, this would require addition of 5 g ammonium sulfate.

If a longer holding time of 14 days were possible, the ammonia concentration in the product would only need to be about 2 g/kg (0.2% by weight, 0.2% by volume).

The product can achieve PFRP status within about 3 days if the final ammonia concentration of the product is brought to about 16 g/kg (1.6% by weight, 1.6% by volume).

The ammonia concentration in the treated product is controlled by addition of the ammonium sulfate or other compound that can be hydrolyzed to ammonia in the highly alkaline environment of the '872 process. In the procedure of Example 2, ammonium sulfate would be introduced into the chemical fixation reactor from a pug mill as the raw sewage enters the reactor. The flow of ammonium sulfate would be metered to introduce the desired concentration of ammonia. If 2 g/kg ammonia were desired, the pug mill would introduce 2 g ammonium chloride per kg of sludge. Likewise, if 16 g/kg ammonia were desired, 16 g ammonium chloride would be metered into the reactor for each kg of sludge.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A method of treating sewage, comprising the steps of:
   mixing sewage with an ammonia source capable of evolving ammonia for treating the sewage; and
   combining the ammonia source and sewage with a silicate and a setting agent in sufficient proportions to form a substantially impermeable mass, the ammonia evolved from the ammonia source being retained within the mass in order to prevent its dissipation into the atmosphere, wherein the ammonia may then be used to destroy parasites in the sewage contained within the mass.

2. The method of claim 1 wherein the step of forming a substantially impermeable mass comprises mixing the sewage with the setting agent and silicate in a volume ratio of about 10:1:0.5.

3. The method of claim 2 which further comprises forming the substantially impermeable mass to be friable and using the mass to fertilize soil.

4. The method of claim 1 wherein the setting agent is Portland cement.

5. The method of claim 1 wherein the setting agent is kiln dust.

6. The method of claim 1 wherein the silicate is an alkali metal silicate.

7. The method of claim 1 wherein the ammonia source is provided in an amount sufficient substantially completely to destroy all viable Ascaris eggs within about three days.

8. The method of claim 1 wherein the sewage is raw, untreated sewage.

9. The method of claim 1 wherein the ammonia source is a solid or liquid.

10. The method of claim 1 further comprising the step of using the substantially impermeable mass as landfill cover.

11. The method of claim 1 further comprising the step of using the substantially impermeable mass as a fertilizer.

12. The method of claim 11 wherein a sufficient amount of ammonia source is mixed with the sewage to bring the final nitrogen content of the impermeable mass to about 0.2% by weight.

13. The method of claim 1 wherein about 2 g of solid or liquid ammonia source is evolved for each kilogram of sewage.

14. The method of claim 1 wherein the ammonia source is selected from the group consisting of ammonium salts, ammonium hydroxide, anhydrous ammonia, and amines.

15. The method of claim 14 wherein the ammonia source is ammonium sulfate.

16. The method of claim 15 wherein the silicate is sodium silicate.

17. The method of claim 1 wherein the sewage contains Ascaris eggs.

18. The method of claim 1 wherein the ammonia source is a primary amine.

19. A method of treating sewage, comprising the steps of:

mixing sewage with an ammonia source capable of evolving ammonia for treating the sewage, the ammonia source comprising a material selected form the group consisting of ammonium salts, ammonium hydroxide, anhydrous ammonia, and amines; and combining the ammonia source and sewage with a silicate and a setting agent to form a substantially impermeable mass, the silicate and setting agent being added in sufficient proportions to produce a friable end product, the ammonia evolved from the ammonia source being retained within the mass in order to prevent its dissipation into the atmosphere, wherein the ammonia may then be used to substantially completely kill all viable Ascaris eggs in the sewage contained within the mass.

20. The method of claim 19 wherein the sewage, setting agent, and silicate are mixed in a volume ratio of about 10:1:0.5.

21. A method of treating raw, untreated sewage, comprising the steps of:

mixing raw, untreated sewage with an ammonia source capable of evolving ammonia for treating the sewage, the ammonia source comprising a material selelcted from the group consisting of ammonium salts, ammonium hydroxide, anhydrous ammonia, and amines capable of hydrolyzing to evolve sufficient ammonia such that the ammonia comprises about 2 g/kg of waste; and combining the ammonia source and sewage with an alkali metal silicate and a setting agent in a volume ratio of sewage to setting agent to silicate of about 10:1:0.5 to form a substantially impermeable mass, the ammonia evolved from the ammonia source being retained within the mass in order to prevent its dissipation into the atmosphere.

* * * * *